US011656850B2

(12) United States Patent
Otenko

(10) Patent No.: US 11,656,850 B2
(45) Date of Patent: May 23, 2023

(54) SYSTEM AND METHOD FOR BOUNDED RECURSION WITH A MICROSERVICES OR OTHER COMPUTING ENVIRONMENT

(71) Applicant: Oracle International Corporation, Redwood Shores, CA (US)

(72) Inventor: Oleksandr Otenko, Winnersh (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/512,316

(22) Filed: Oct. 27, 2021

(65) Prior Publication Data

US 2022/0137931 A1    May 5, 2022

Related U.S. Application Data

(60) Provisional application No. 63/108,093, filed on Oct. 30, 2020.

(51) Int. Cl.
| | | |
|---|---|---|
| *G06F 9/44* | (2018.01) | |
| *G06F 9/445* | (2018.01) | |
| *G06F 9/455* | (2018.01) | |
| *G06F 8/20* | (2018.01) | |

(52) U.S. Cl.
CPC ...................... *G06F 8/20* (2013.01)

(58) Field of Classification Search
CPC .................. G06F 8/20; G06F 9/527
See application file for complete search history.

(56) References Cited

U.S. PATENT DOCUMENTS

| | | | |
|---|---|---|---|
| 9,911,094 B1 | 3/2018 | Chen | |
| 10,205,640 B2* | 2/2019 | Chan | .................. G06F 11/0718 |
| 10,419,469 B1* | 9/2019 | Singh | ................... G06F 16/9024 |

(Continued)

FOREIGN PATENT DOCUMENTS

| | | | | | |
|---|---|---|---|---|---|
| CN | 102929781 A | * | 2/2013 | | |
| GB | 2373072 A | * | 9/2002 | .......... | G06F 11/3608 |

(Continued)

OTHER PUBLICATIONS

Soren van der Wall, Bounded Analysis of Concurrent and Recursive Programs, 2019, pp. 1-91. https://www.tcs.cs.tu-bs.de/documents/thesis-van-der-wall-2019.pdf (Year: 2019).*

(Continued)

*Primary Examiner* — Mongbao Nguyen
(74) *Attorney, Agent, or Firm* — Tucker Ellis LLP

(57) ABSTRACT

Described herein is a system and method for providing bounded recursion under bounded concurrency, for use with microservices or reactive programming environments. The system is adapted to determine, for example during evaluation of a chain of Continuations, that the concurrency of onComplete invocations is mutually exclusive with the recursive invocations. The number of concurrently executing threads can be bounded, such that the recursion only needs to operate within a reasonable bound—it does not need to be fully precluded. With these relaxations in mind, the system can enforce a bound on recursion without further synchronization actions.

15 Claims, 10 Drawing Sheets

(56) References Cited

U.S. PATENT DOCUMENTS

| | | | | |
|---|---|---|---|---|
| 2009/0193416 | A1* | 7/2009 | Kahlon | G06F 11/3608 |
| | | | | 718/100 |
| 2009/0320005 | A1* | 12/2009 | Toub | G06F 8/45 |
| | | | | 717/149 |
| 2012/0304172 | A1* | 11/2012 | Greifeneder | G06F 11/3419 |
| | | | | 718/1 |
| 2015/0112700 | A1 | 4/2015 | Sublett | |
| 2019/0220331 | A1* | 7/2019 | Duggal | G06F 9/5072 |
| 2019/0311050 | A1* | 10/2019 | Capillo Carril | G06F 16/25 |
| 2019/0349261 | A1* | 11/2019 | Smith | H04L 61/5069 |
| 2022/0137961 | A1* | 5/2022 | Quirynen | G05B 13/048 |
| | | | | 712/210 |

FOREIGN PATENT DOCUMENTS

| | | | | |
|---|---|---|---|---|
| WO | WO-2020002349 | A1 * | 1/2020 | C08F 2/001 |
| WO | WO-2020093339 | A1 * | 5/2020 | |

OTHER PUBLICATIONS

Miguel Angel Aguilar, Extraction of Recursion Level Parallelism for Embedded Multicore Systems, 2017, pp. 154-162. https://ieeexplore.ieee.org/stamp/stamp.jsp?tp=&arnumber=8344623 (Year: 2017).*

Haichi Wang, Towards Generating Thread-Safe Classes Automatically, Sep. 2020, pp. 943-953. https://dl.acm.org/doi/pdf/10.1145/3324884.3416625 (Year: 2020).*

Christian Motika, Programming Deterministic Reactive Systems with Synchronous Java, 2014, pp. 1-8. https://ieeexplore.ieee.org/stamp/stamp.jsp?tp=&arnumber=6913222 (Year: 2014).*

Tom Van den Buick, Reactive programming with spring reactor, 2016, pp. 1-19. https://ordina-jworks.github.io/reactive/2016/12/12/Reactive-Programming-Spring-Reactor.html (Year: 2016).*

European Patent Office, International Searching Authority, International Search Report and Written Opinion dated Feb. 14, 2021 for International Application No. PCT/US2021/057079, 11 pages.

European Patent Office, International Searching Authority, International Search Report and Written Opinion dated Dec. 8, 2021 for International Application No. PCT/US2021/051585, 14 pages.

European Patent Office, International Searching Authority, International Search Report and Written Opinion dated Dec. 13, 2021 for International Application No. PCT/US2021/051587, 11 pages.

Mei, HaiTao et al., "A Java-Based Real-Time Reactive Stream Framework", 2016 IEEE 19th International Symposium on Real-Time Distributed Computing, pp. 204-211.

European Patent Office, International Searching Authority, International Search Report and Written Opinion dated Dec. 8, 2021 for International Application No. PCT/US2021/57079, 14 pages.

* cited by examiner

SYSTEM AND METHOD FOR BOUNDED RECURSION WITH A MICROSERVICES OR OTHER COMPUTING ENVIRONMENT

CLAIM OF PRIORITY

This application claims the benefit of priority to U.S. Provisional application titled "SYSTEM AND METHOD FOR BOUNDED RECURSION UNDER BOUNDED CONCURRENCY WITH A MICROSERVICES OR OTHER COMPUTING ENVIRONMENT", Application No. 63/108,093, filed Oct. 30, 2020; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing and other computing environments, software development, microservice architectures, and reactive computing, and are particularly directed to systems and methods for providing bounded recursion under bounded concurrency, in such environments.

BACKGROUND

Microservice environments can present a software application as a collection of loosely-coupled services that are independently deployable and communicate with one another over a network. The microservice approach can be used, for example, to develop software applications to be provided in cloud computing environments as cloud services. In such environments, microservices can be used to provide elasticity, and to make efficient use of computational resources.

Reactive computing environments generally support the use of publishers and subscribers that use onComplete signals. When flattening Publishers are used, the processing of an onComplete from one inner Publisher can cause the start of processing signals from a next inner Publisher. However, it can be difficult to determine whether the processing of signals from the next inner Publisher will be performed synchronously (if the Publisher happens to have the data ready), or concurrently (if the Publisher is designed to wait for some data). If the number of inner Publishers is large, or is unbounded, then such processing may end up consuming an excessive amount of stack due to recursive invocation of onComplete.

SUMMARY

In accordance with an embodiment, described herein is a system and method for providing bounded recursion under bounded concurrency, for use with microservices or reactive programming environments.

In accordance with an embodiment, the system is adapted to determine, for example during evaluation of a chain of Continuations, that the concurrency of onComplete invocations is mutually exclusive with the recursive invocations. The number of concurrently executing threads can be bounded, such that the recursion only needs to operate within a reasonable bound—it does not need to be fully precluded. With these relaxations in mind, the system can enforce a bound on recursion without further synchronization actions.

In many instances only an additional load-load fence is needed, and in cases where the number of concurrent threads is too large, then a single uncontended compare and set can be used at the end of recursion, if no concurrent invocations of onComplete are detected.

DETAILED DESCRIPTION

As described above, microservice architectures can present a software application as a collection of loosely-coupled services that are independently deployable and communicate with one another over a network. The microservice approach can be used, for example, to develop software applications to be provided in cloud computing environments as cloud services. In such environments, microservices can be used to provide elasticity, and to make efficient use of computational resources.

Software development frameworks such as Helidon assist in the development of microservices. For example, Helidon offers Standard Edition (SE) and MicroProfile (MP) programming models or environments, each of which include a collection of software libraries that support features such as configuration, security, or web server functionality; and provide a software developer with a foundation upon which to create a microservice.

Generally described, Helidon alleviates the need for the software developer to program according to a specific tooling or deployment model, and enables the running of microservices without the need for an application server. Helidon libraries can interoperate with other software development, deployment, and/or monitoring tools such as, for example, Docker, Kubernetes, Prometheus, or OpenTracing.

Microservices Environments (Helidon)

Figure 1:
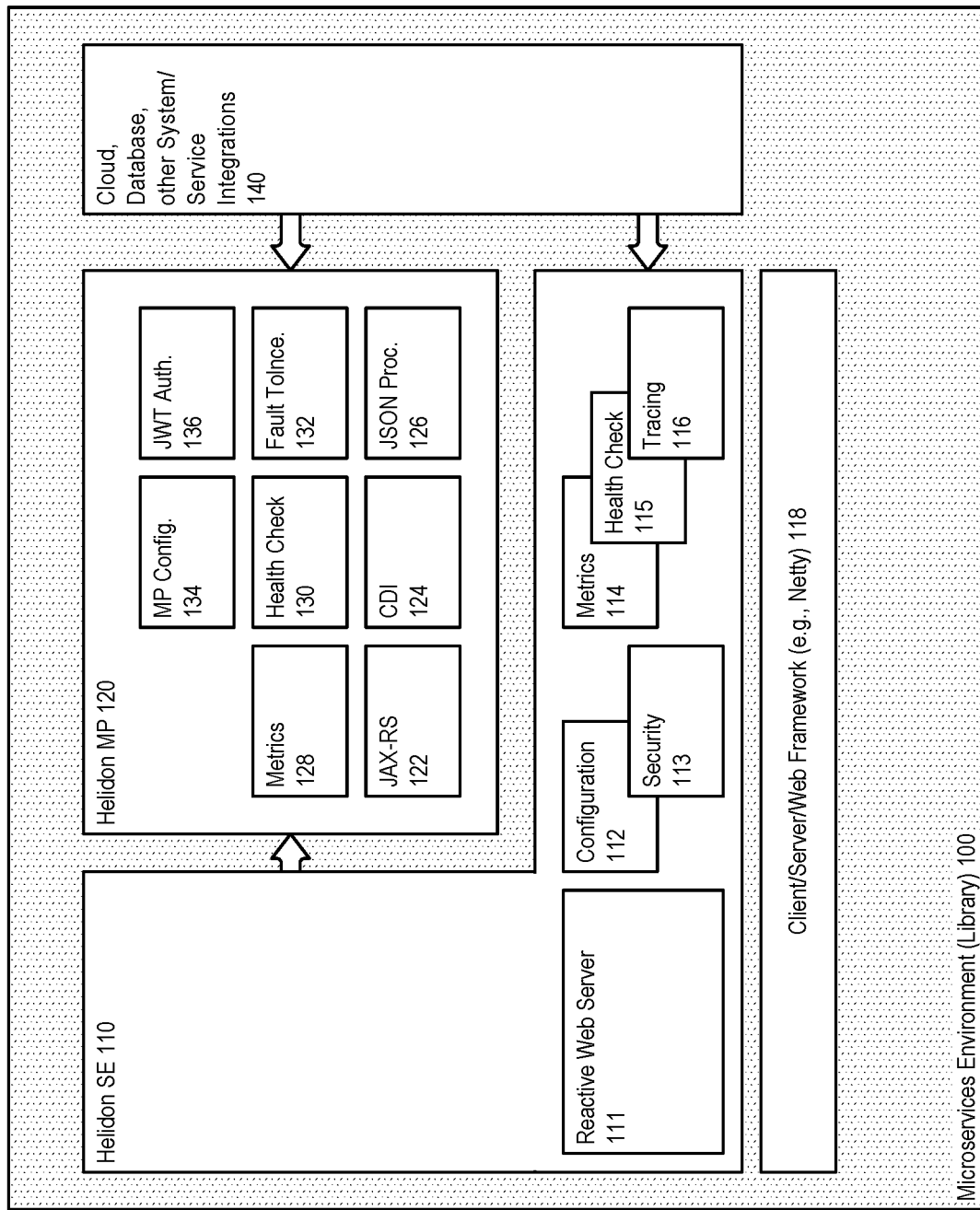
FIG. 1 illustrates an example microservices environment that provides a software development framework, in accordance with an embodiment.

FIG. 1 illustrates an example microservices environment that provides a software development framework, in accordance with an embodiment.

As illustrated in FIG. 1, in accordance with an embodiment, a Helidon microservices environment 100 offers both Standard Edition (SE) and MicroProfile (MP) programming models or environments.

In accordance with an embodiment, a Helidon SE environment 110 can include various libraries, APIs, or other components, such as, for example, a reactive web server 111, which provides an asynchronous and reactive API for creating web applications; a configuration API 112, which provides a Java API to load and process configuration properties in key/value form into a config object which an application can then use to retrieve config data; and a security component 113, which provides authentication, authorization, and outbound security; and can also include metrics 114, health check 115, and tracing 116 or other components.

In accordance with an embodiment, a Helidon MP environment 120 can include various libraries, APIs, or other components, such as, for example, JAX-RS 122, JSON-P 126, CDI 124, metrics 128, health check 130 fault tolerance 132, MicroProfile configuration 134, and JWT authentication 136 components. In accordance with an embodiment, the web server can be provided by a non-blocking client/server/web framework 118, such as, for example, Netty. The microservices environment can also enable interactions with cloud, database, or other systems or services 140.

Figure 2:
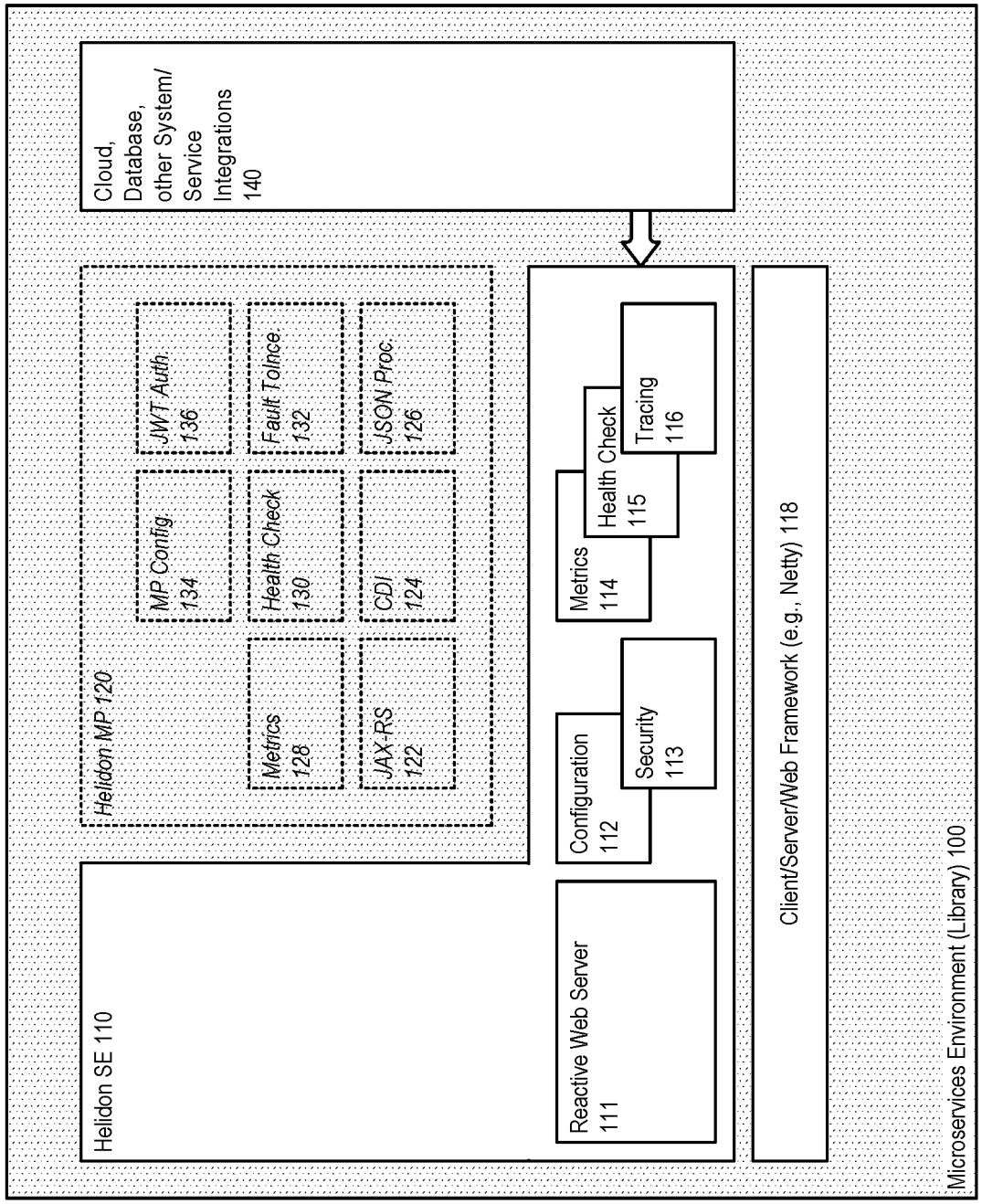
FIG. 2 illustrates an example Helidon SE microservices environment, in accordance with an embodiment.

FIG. 2 illustrates an example Helidon SE microservices environment, in accordance with an embodiment.

As illustrated in FIG. 2, in accordance with an embodiment, a Helidon SE environment supports a functional programming style that uses the web server, security and configuration components directly; provides the software developer with transparency and control; and supports Java features such as reactive streams, and asynchronous and functional programming. A Helidon SE environment provides a framework by which the software developer can build lightweight reactive microservices.

Figure 3:
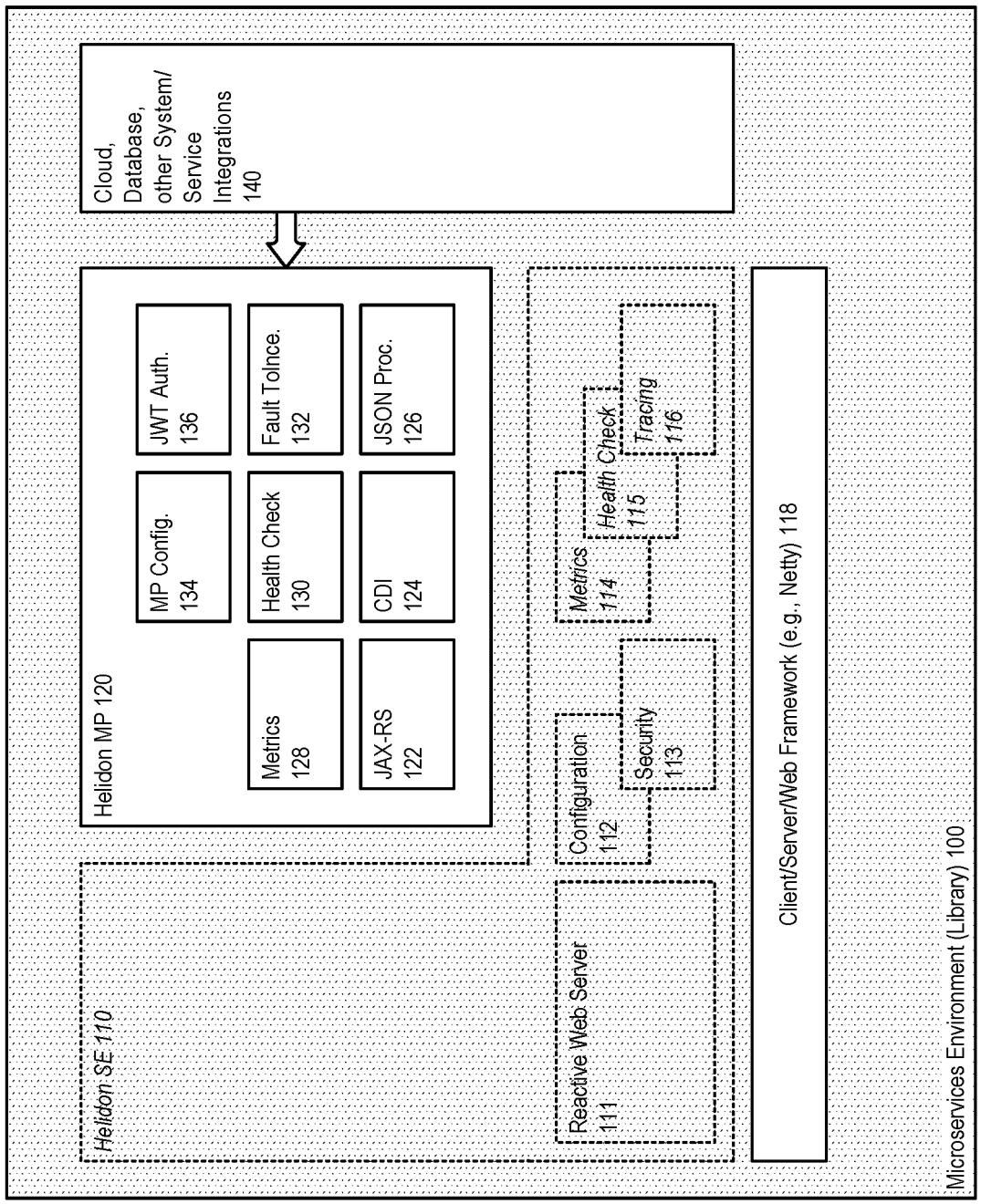
FIG. 3 illustrates an example Helidon MP microservices environment, in accordance with an embodiment.

FIG. 3 illustrates an example Helidon MP microservices environment, in accordance with an embodiment.

As illustrated in FIG. 3, in accordance with an embodiment, a Helidon MP environment supports a declarative programming style, through the use of a MicroProfile family of APIs built on top of the Helidon libraries. A MicroProfile definition (for example, as specified by the Eclipse MicroProfile project) can be used to support application portability across multiple MicroProfile runtimes.

In accordance with an embodiment, a microservices environment can present a software application as a collection of loosely-coupled services that are independently deployable and communicate with one another over a network. For example, a Helidon microservices environment can support the use of a remote procedure call (e.g., gRPC) framework or component, which enables (client and/or server) applications to communicate within the microservices environment, to build connected systems.

Figure 4:
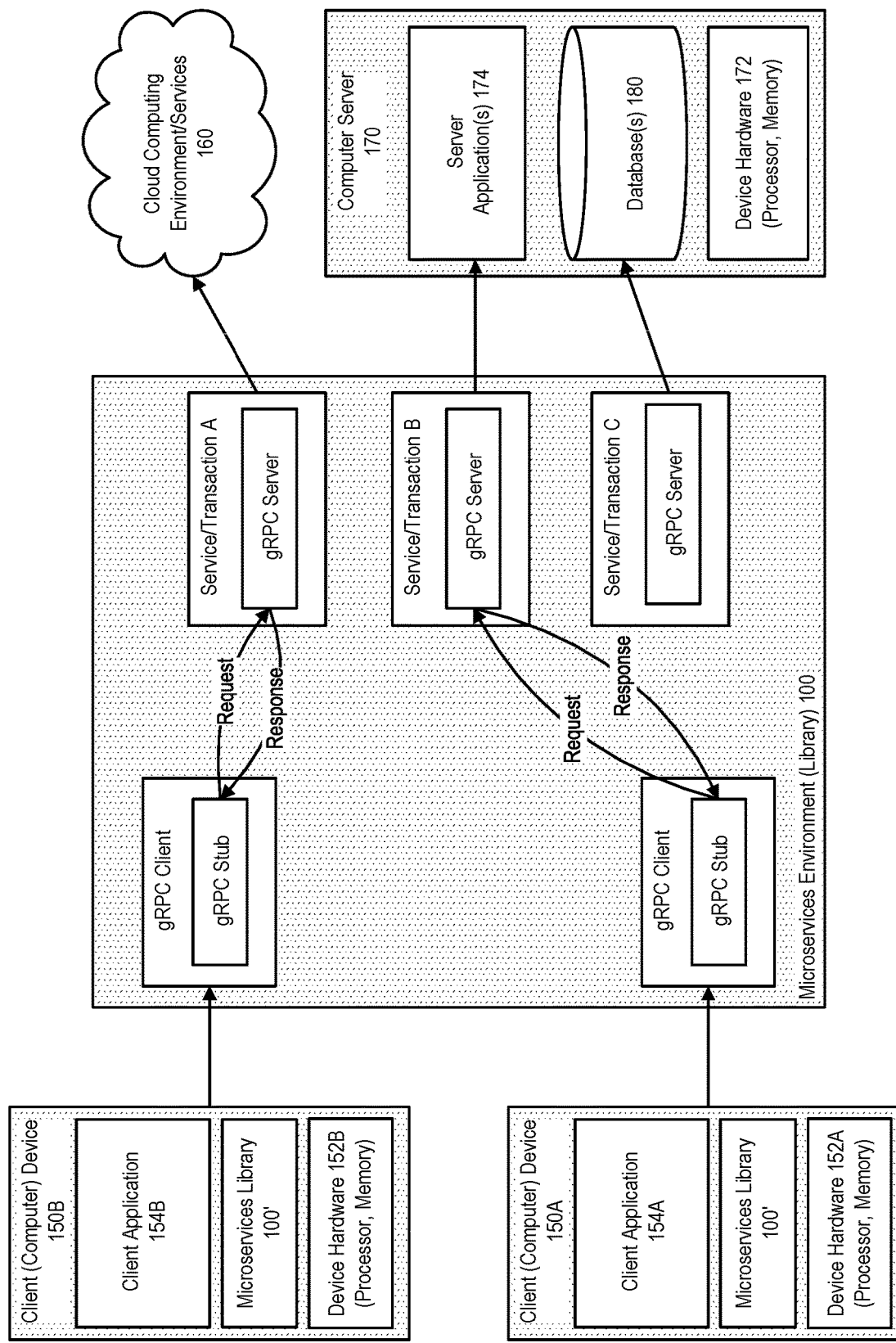
FIG. 4 illustrates communication in a microservices environment, in accordance with an embodiment.

FIG. 4 illustrates communication in a microservices environment, in accordance with an embodiment.

The example shown and described in FIG. 4 is provided for purposes of illustrating an example of one type of communication supported by a microservices environment; in accordance with other embodiments and examples, other types of communication can be supported.

As illustrated in FIG. 4, in accordance with an embodiment, a remote procedure call framework enables definition of a service and methods that can be called remotely. A server or service can handle calls from a client, via a local object (stub) at the client that enables a client application to directly call a method on a server application as if it were a local object. The server/service implements methods to handle client calls, including decoding incoming requests, executing service methods, and encoding service responses. The local object (stub) implements the same methods as the service, wrapping the parameters for the call in an appropriate protocol buffer message type, which is then provided as requests to the server.

In accordance with an embodiment, a microservices library enables access by client applications to communicate with microservices or interact with cloud, database, or other systems or services, for purposes of accessing data, processing transactions, or performing other operations associated with those systems or services.

Reactive Environments

In a traditional message-driven environment, a producer sends messages to a consumer as they become available; however if the consumer is not able to process the messages in real time then the received messages are stored in a buffer, which can lead to performance issues.

In accordance with an embodiment, a microservices environment can provide a reactive environment, for example a reactive engine or reactive messaging API, for use with activities such as transaction processing, asynchronous messaging channels, or reactive streams.

Figure 5:
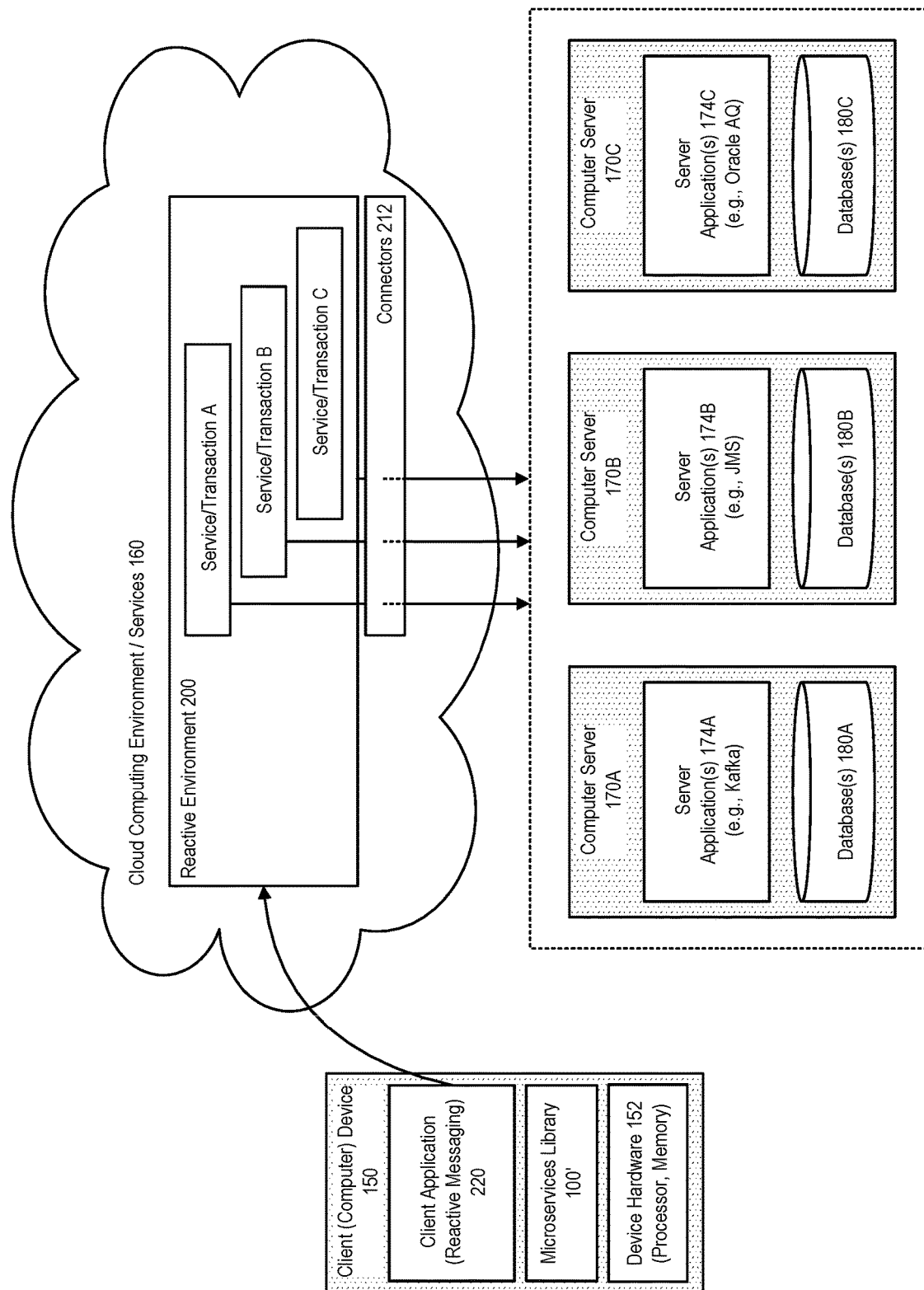
FIG. 5 illustrates the use of a reactive environment in a microservices environment, in accordance with an embodiment.

FIG. 5 illustrates the use of a reactive environment in a microservices environment, in accordance with an embodiment.

The example shown and described in FIG. 5 is provided for purposes of illustrating an example of one type or usage of a reactive environment as supported by a microservices environment; in accordance with other embodiments and examples, other types and usages of reactive environments can be provided.

As illustrated in FIG. 5, in accordance with an embodiment, the reactive environment 200 enables a client application 220 to communicate reactively with services, as publishers and subscribers, within the microservices environment. Connectors 212 can be used to provide publishers and subscribers with access to reactive messaging channels, or to provide support for the use of reactive messaging with Kafka, JMS, or other type of messaging, message queueing, or stream processing environments. The reactive environment enables asynchronous stream processing with non-blocking back pressure—a subscriber informs a publisher as to how much data it can process, and the publisher sends an appropriate amount of data as requested by the subscriber.

Figure 6:
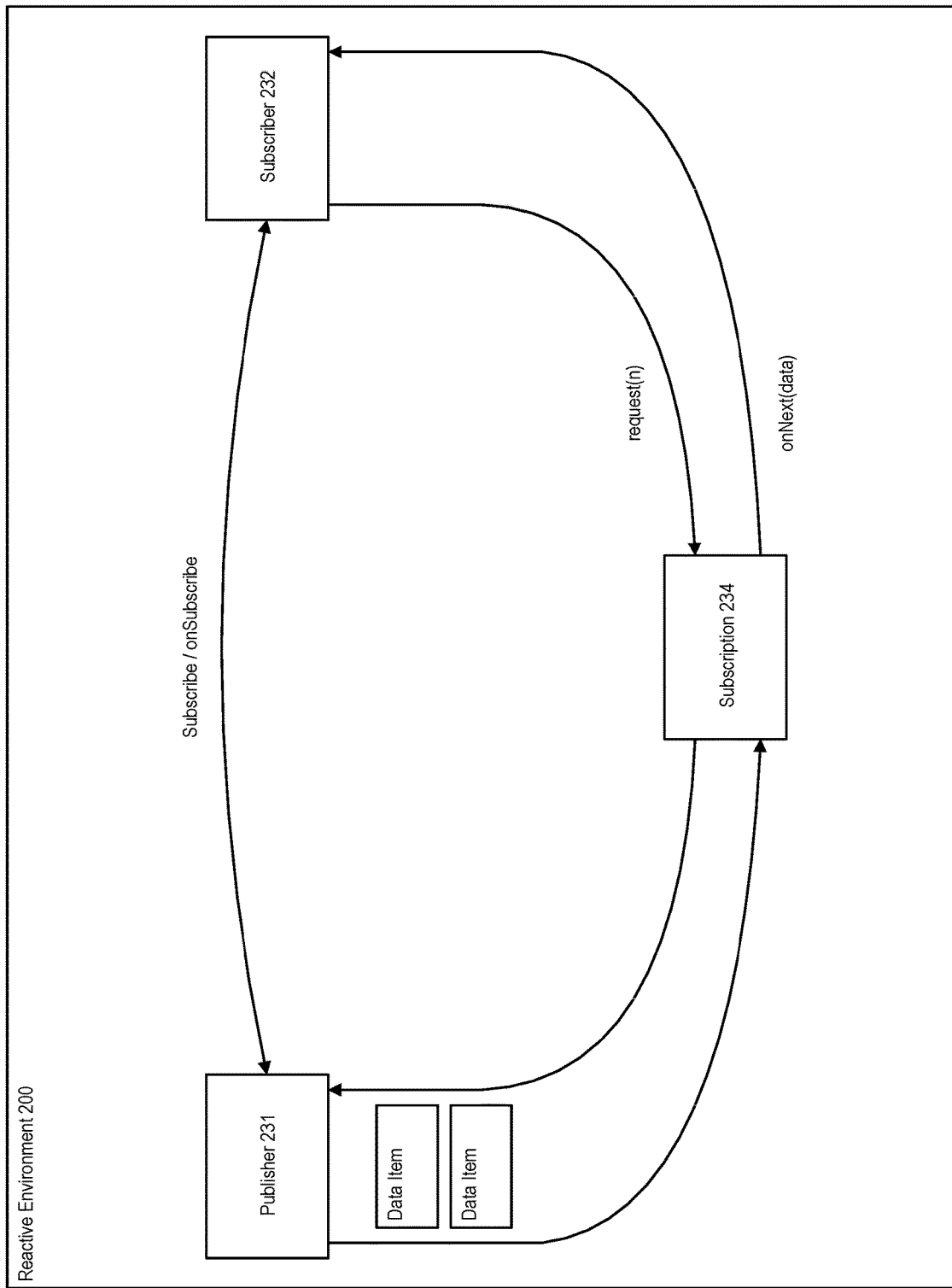
FIG. 6 further illustrates the use of a reactive environment, in accordance with an embodiment.

FIG. 6 further illustrates the use of a reactive environment, in accordance with an embodiment.

As illustrated in FIG. 6, in accordance with an embodiment, a publisher 231 (referred to herein in some examples as a Publisher) operates as a producer of data, according to the demand requested by its subscribers. A subscriber 232 (referred to herein in some examples as a Subscriber) operates as a consumer of the data produced by a publisher. A subscription (referred to herein in some examples as a Subscription) 234 defines the relationship between a subscriber subscribing to a publisher, and provides a mechanism by which the subscriber can request more data (from the publisher). In accordance with an embodiment, a processor (referred to herein in some examples as a Processor) can be provided that operates as a message/data processing stage and, via subscriptions, both as a subscriber and a publisher.

Figure 7:
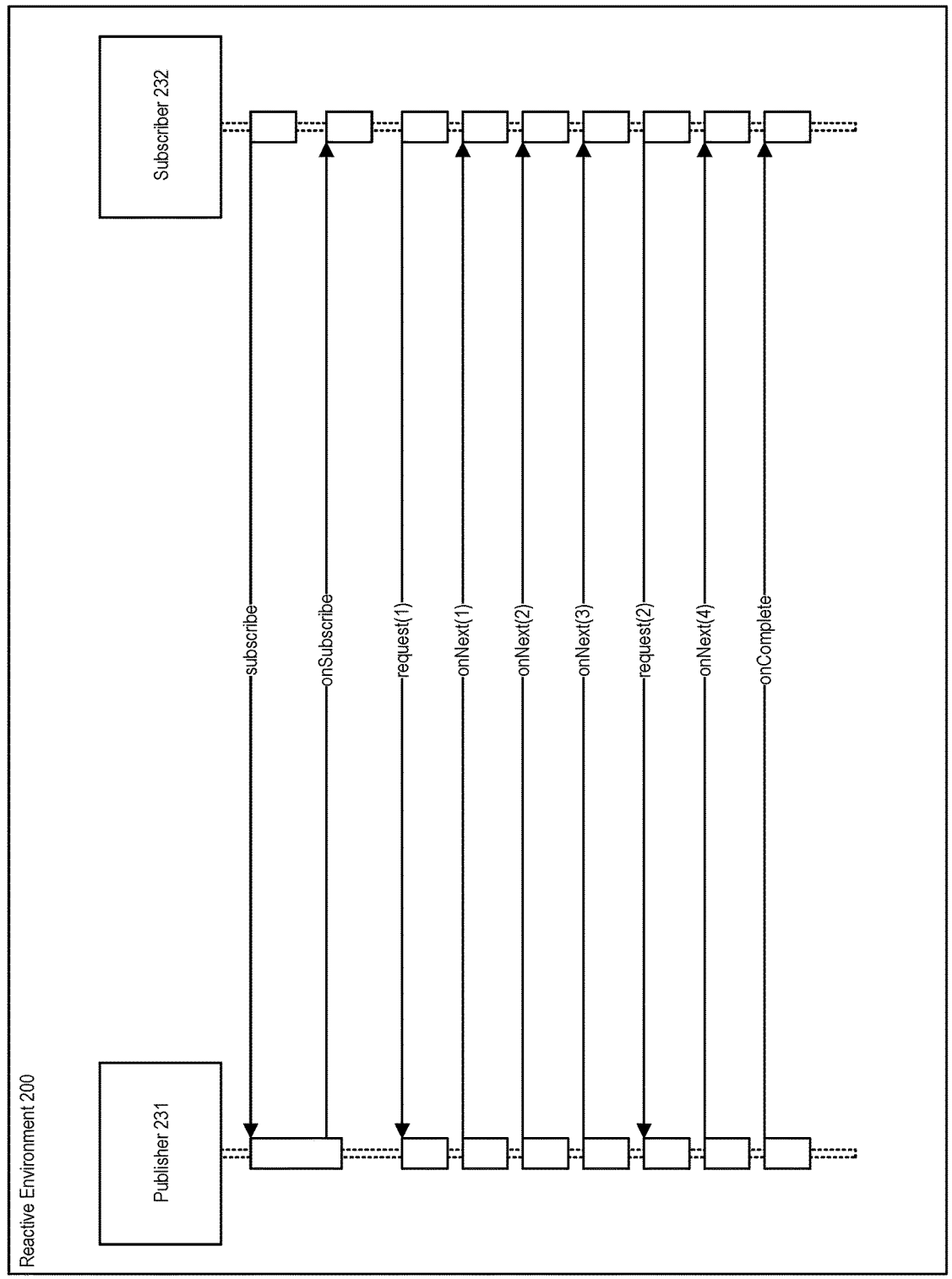
FIG. 7 further illustrates the use of a reactive environment, in accordance with an embodiment.

FIG. 7 further illustrates the use of a reactive environment, in accordance with an embodiment.

As illustrated in FIG. 7, in accordance with an embodiment, when a subscriber is passed to a publisher, the subscriber receives a call on method onSubscribe(Subscription), but will not immediately begin to receive data items or other events. Data items are only received by the subscriber when it calls method request(long) within its subscription, which signals to the publisher a demand for more data. A subscriber can receive data through invocation of a method Subscriber.onNext, which is invoked with the next item, and can be called a number (n) times as determined by a long value passed on the method request(long) of its subscription. A method Subscriber.onError ( ) can be invoked when an error occurs while processing the stream. A method Subscriber.onComplete( ) can be invoked when there is no further data to be processed. In the case of both an onError( ) and onComplete( ) event being invoked, then no new data will be emitted by the publisher, even if the method request (long) is called again.

Bounded Concurrency

Reactive computing environments generally support the use of publishers and subscribers that use onComplete signals. When flattening Publishers are used, the processing of an onComplete from one inner Publisher can cause the start of processing signals from a next inner Publisher. However, it can be difficult to determine whether the processing of signals from the next inner Publisher will be performed synchronously (if the Publisher happens to have the data ready), or concurrently (if the Publisher is designed to wait for some data). If the number of inner Publishers is large, or is unbounded, then such processing may end up consuming an excessive amount of stack due to recursive invocation of onComplete.

When using a reactive API to implement asynchronous processing, it is necessary to distinguish when certain stages of computation are being re-entered recursively, in order to control the depth of recursion, but it may also be executed concurrently by a cooperating thread (Thread). It is not always possible to predict whether that stage is going to be executed recursively, or concurrently. Therefore, provisions must be included to ensure certain methods are reentrant sequentially, but not recursively. Typical implementations involve locks or atomic counters.

Generally, there are always two atomic updates of a value for every invocation of onComplete, regardless of whether it is recursive, concurrent, or no recursion or concurrency at all. A similar issue exists in general for many other cases of Continuation processing. Continuations are chained, and the chain may grow during processing of the chain. It is necessary to limit the amount of processing performed recursively, as the chain of Continuations can potentially grow without bound.

In accordance with an embodiment, described herein is a system and method for providing bounded recursion under bounded concurrency, for use with microservices or reactive programming environments.

In accordance with an embodiment, the system is adapted to determine, for example during evaluation of a chain of Continuations, that the concurrency of onComplete invocations is mutually exclusive with the recursive invocations. The number of concurrently executing threads can be bounded, such that the recursion only needs to operate within a reasonable bound—it does not need to be fully precluded. With these relaxations in mind, the system can enforce a bound on recursion without further synchronization actions.

In many instances only an additional load-load fence is needed, and in cases where the number of concurrent threads is too large, then a single uncontended compare and set can be used at the end of recursion, if no concurrent invocations of onComplete are detected.

In accordance with an embodiment, technical advantages of the described approach include, for example, that the process can be reduced to a few load-and-stores with fairly relaxed ordering under certain assumptions about the level of concurrency, or a single uncontended compare and set, if that assumption cannot be made; and additionally that the approach supports a lattice of happens-before edges between cheap memory operations, compared to atomic updates used typically, which operates as a lock that allows concurrent acquisition of the lock, but not re-acquisition from the same thread; which features contribute to improved system performance.

Bounded Recursion Under Bounded Concurrency

Figure 8:
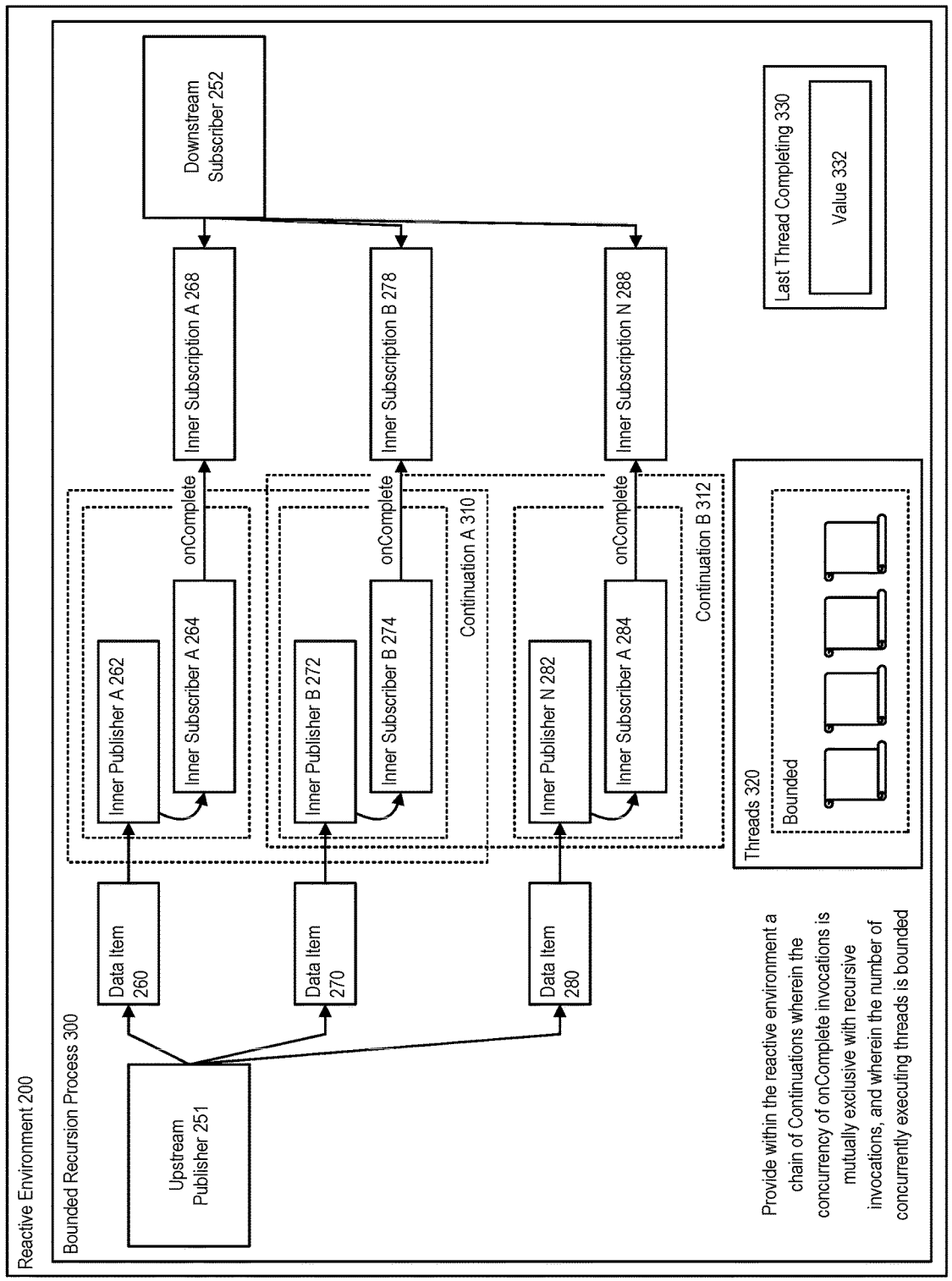
FIG. 8 illustrates a system for providing bounded recursion under bounded concurrency, in accordance with an embodiment.

FIG. 8 illustrates a system for providing bounded recursion under bounded concurrency, in accordance with an embodiment.

As illustrated in FIG. 8, in accordance with an embodiment, in accordance with various embodiments, the system includes or operates a bounded recursion process 300 for use with an upstream publisher (Publisher) 251 that publishes data items 260, 270, 280 via a plurality of inner Publishers A 262, B 272, N 282, each of which is associated with an inner subscriber 264, 274, 284 respectively, and which provide data via inner subscription 268, 278, 288 as a stream of events for use by a downstream subscriber (Subscriber) 252.

In a system that utilizes Continuations (e.g., illustrated here as Continuation A 310, Continuation B 312), there is often a problem of bounding the recursion, when evaluating a chain of Continuations. Typically such chains can grow much longer than computations structured without Continuations—potentially infinite since the chain can grow during the evaluation of previous Continuations, and may represent what would be a loop in the direct style of expression.

Typically such a problem is addressed through some locking scheme:

```
private final AtomicInteger completions = new AtomicInteger( );
public void onComplete( ) {
  if (completions.getAndIncrement( ) != 0) {
    return;
  }
  do {
    //... operations containing full memory barrier
    //... and potentially calling onComplete
  } while(completions.decrementAndGet( ) != 0);
}
```

In this example, the completions counter would count recursive or concurrent invocations of onComplete, and loop instead of recursing, if any are detected. However, this comes at the cost of two extra atomic operations for every invocation of onComplete.

In accordance with an embodiment, it can be observed that during evaluation of a chain of Continuations the concurrency of onComplete invocations is mutually exclusive with the recursive invocations. Additionally, it can be observed that typically the number of concurrently executing threads 320 is bounded, and that the recursion really only needs to have a reasonable bound—it does not need to be fully precluded.

With these relaxations in mind, it is possible to enforce a bound on recursion without any synchronization actions at all—only an additional load-load fence is needed in many instances, and in cases where the number of concurrent threads is too large—a single uncontended compare and set at the end of recursion, if no concurrent invocations of onComplete are detected (compare and set remains uncontended).

```
private boolean redo;
private final AtomicReference<Thread>
    lastThreadCompleting = new AtomicReference<>( );
public void onComplete( ) {
    Thread current = Thread.currentThread( );
    if (lastThreadCompleting.getOpaque( ) == current) {
        redo = true;
        return;
    }
    lastThreadCompleting.setOpaque(current);
    VarHandle.storeStoreFence( );
    boolean sameThread;
    boolean again;
    do {
        redo = false;
        //... operations containing full memory barrier
        //... and potentially calling onComplete
        again = redo;
        VarHandle.loadLoadFence( );
        sameThread = lastThreadCompleting.getOpaque( ) == current;
    } while(sameThread && again);
    if (sameThread) {
        lastThreadCompleting.compareAndSet(current, null);
    }
}
```

Figure 9:
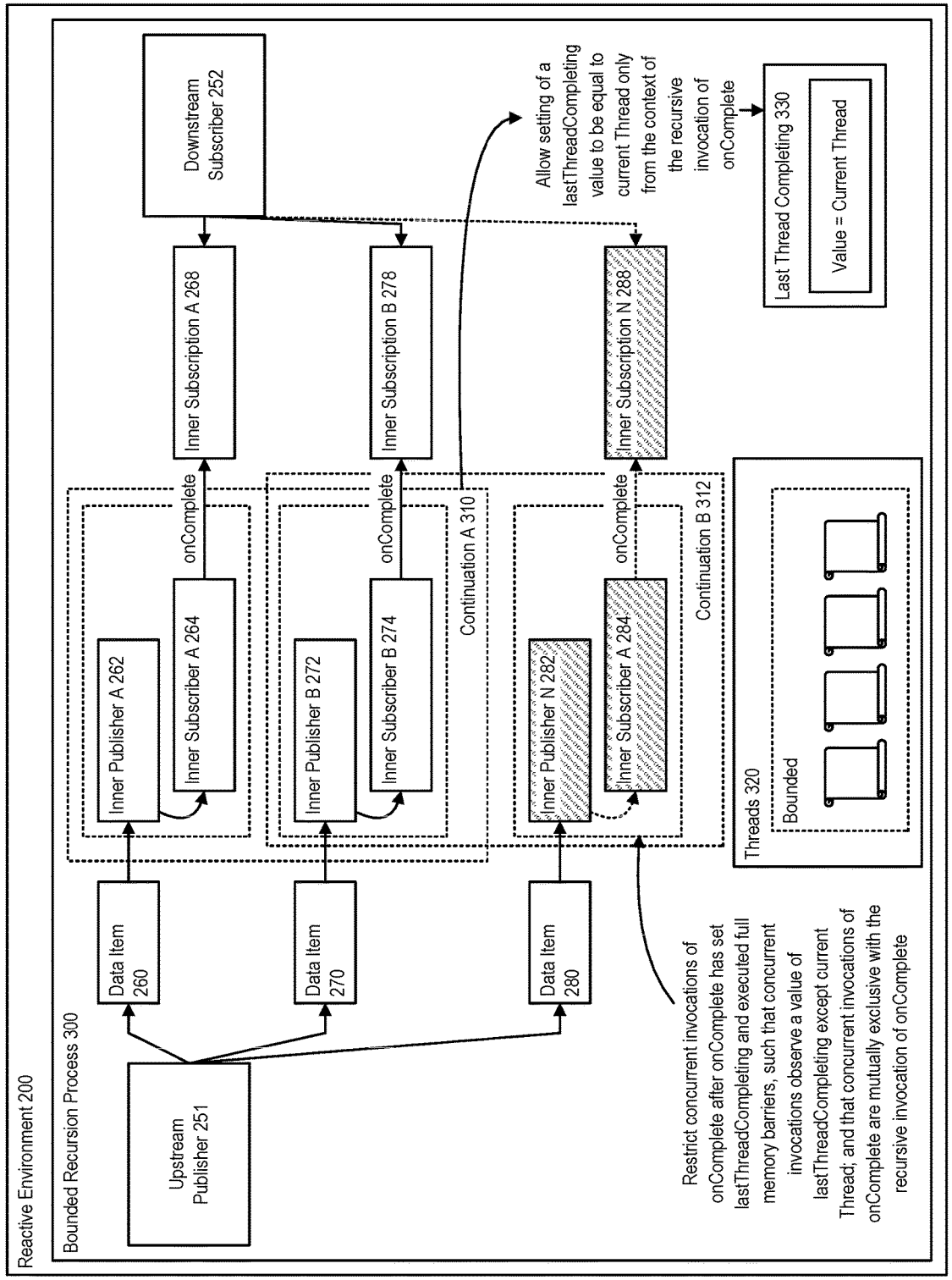
FIG. 9 further illustrates a system for providing bounded recursion under bounded concurrency, in accordance with an embodiment.

FIG. 9 further illustrates a system for providing bounded recursion under bounded concurrency, in accordance with an embodiment.

As illustrated in FIG. 9, in accordance with an embodiment, the process or algorithm as described herein includes:

A value 332 for last thread completing 330 (lastThreadCompleting) can be seen to be equal to the current thread (currentThread) only from the context of the recursive invocation of onComplete. This establishes the condition for a safe return without recursion.

Any concurrent invocations of onComplete can happen only after some onComplete has set lastThreadCompleting and executed full memory barriers. Any previous invocations of onComplete will store null if they observe there were no concurrent invocations. This will make the concurrent invocations observe any value of lastThreadCompleting except current Thread.

A recursive invocation of onComplete setting redo cannot be missed by the caller, because the store is in program order, and reaching that line guarantees there are no concurrent stores to redo—concurrent invocations of onComplete are mutually exclusive with the recursive invocation of onComplete.

If the number of concurrent executors of Continuations is small, we can afford to replace lastThreadCompleting.compareAndSet(current, null) with lastThreadCompleting.setOpaque(null); this may result in recursion when a concurrently executing onComplete observes lastThreadCompleting.getOpaque( )!=current, but the recursion will be bounded by the number of concurrent executions of onComplete.

Safety Properties—Reentrance

In accordance with an embodiment, this onComplete can be invoked by the same thread sequentially or recursively. The lastThreadCompleting can be seen to be equal to current Thread only if no other stores to the variable were observed: at least all the stores to this variable done by the current Thread will be observed; all stores to this variable observed before, will be observed.

In accordance with an embodiment, suppose there was an earlier invocation of onComplete by the same thread (sameThread). If that invocation observed sameThread being true, it would have set lastThreadCompleting to null before returning, and the subsequent invocation of onComplete will not observe lastThreadCompleting equal to current Thread.

Alternatively, if that invocation observed sameThread is false, then that invocation would not modify lastThreadCompleting, but also the subsequent invocation of onComplete will not observe lastThreadCompleting equal to current Thread, as there would be no intervening stores of the reference to the current Thread to lastThreadCompleting—only current Thread could have done that.

In accordance with an embodiment, the system effectively operates so that the compareAndSet either succeeds to set lastThreadCompleting to null because there were no concurrent threads reaching the line setting lastThreadCompleting, or fails to set it, because a concurrent thread succeeded to modify lastThreadCompleting. In both cases, the lastThreadCompleting can be seen to not equal to current upon re-entrance to onComplete.

Safety Properties—Space Bound

In accordance with an embodiment, the consumption of stack is bounded by flagging an invocation of onComplete when it detects it is being invoked by the same Thread. Concurrent invocations of onComplete cannot interfere with the recursion detection process, because each Continuation is resumed one at a time, which establishes a happens-before edge between the flag setting and the resumption of the Continuations: if a Continuation is resumed in another thread, it will be the responsibility of that thread to resume any subsequent Continuations, and the current Thread will not attempt resuming any other Continuations without returning first.

In accordance with an embodiment, an important aspect is the relative ordering of stores and loads of redo and lastThreadCompleting. The system is not obliged to observe concurrent invocations of onComplete performing recursion—since we are only interested in observing recursion occurring in the same Thread. However, when the system observes a redo begin updated, we need to be able to distinguish the modifications performed by the same Thread from modifications performed by the other threads.

In accordance with an embodiment, the store-store fence ensures that if the store to redo does get issued, it will be observed only after the store to lastThreadCompleting can be observed. Consequently, the load-load fence ensures that lastThreadCompleting is loaded only after redo has been loaded. This means that observing the redo set to true and lastThreadCompleting equal to current is a proof that there are no writes to lastThreadCompleting—concurrent executions of onComplete would be able to modify redo only upon re-entering onComplete recursively, and that only after modifying lastThreadCompleting In accordance with an embodiment, a compareAndSet of lastThreadCompleting upon return from onComplete allows to strictly control recursion: there can be absolutely no recursive invocations of onComplete that do not observe lastThreadCompleting equal to current (that is, all recursive invocations observe lastThreadCompleting set to current, and return through the branch flagging redo).

An unconditional modification of lastThreadCompleting may be permissible in some systems. In this case for N concurrent invocations of onComplete there can be up to N pending stores of null to lastThreadCompleting. This number cannot exceed N, as each thread can execute only one such store—any recursion, even if it exists, will observe either this store of null, or any other store, so cannot observe sameThread set to true. Additionally, N such pending stores can interfere with up to N stores of current to lastThreadCompleting, thus causing recursion up to N levels deep.

In accordance with various embodiments, the design provides performance advantages over designs that require every invocation of onComplete to cause execution of two atomic operations, and removes the need to migrate the processor/CPU cache contents from the thread that happens to execute onComplete concurrently with the previous onComplete invocation:

Additionally, although other approaches may require the first caller of onComplete to process as many onComplete as there are concurrent invocations; thus any data a concurrent thread may have produced, will need to move to the processor/CPU cache of the owner of the "lock"; instead and in accordance with an embodiment, the described approach relinquishes ownership of the onComplete loop to any concurrent callers. In this way, they both make progress unimpeded, and any data the concurrent thread may have produced, remains CPU-local.

Figure 10:
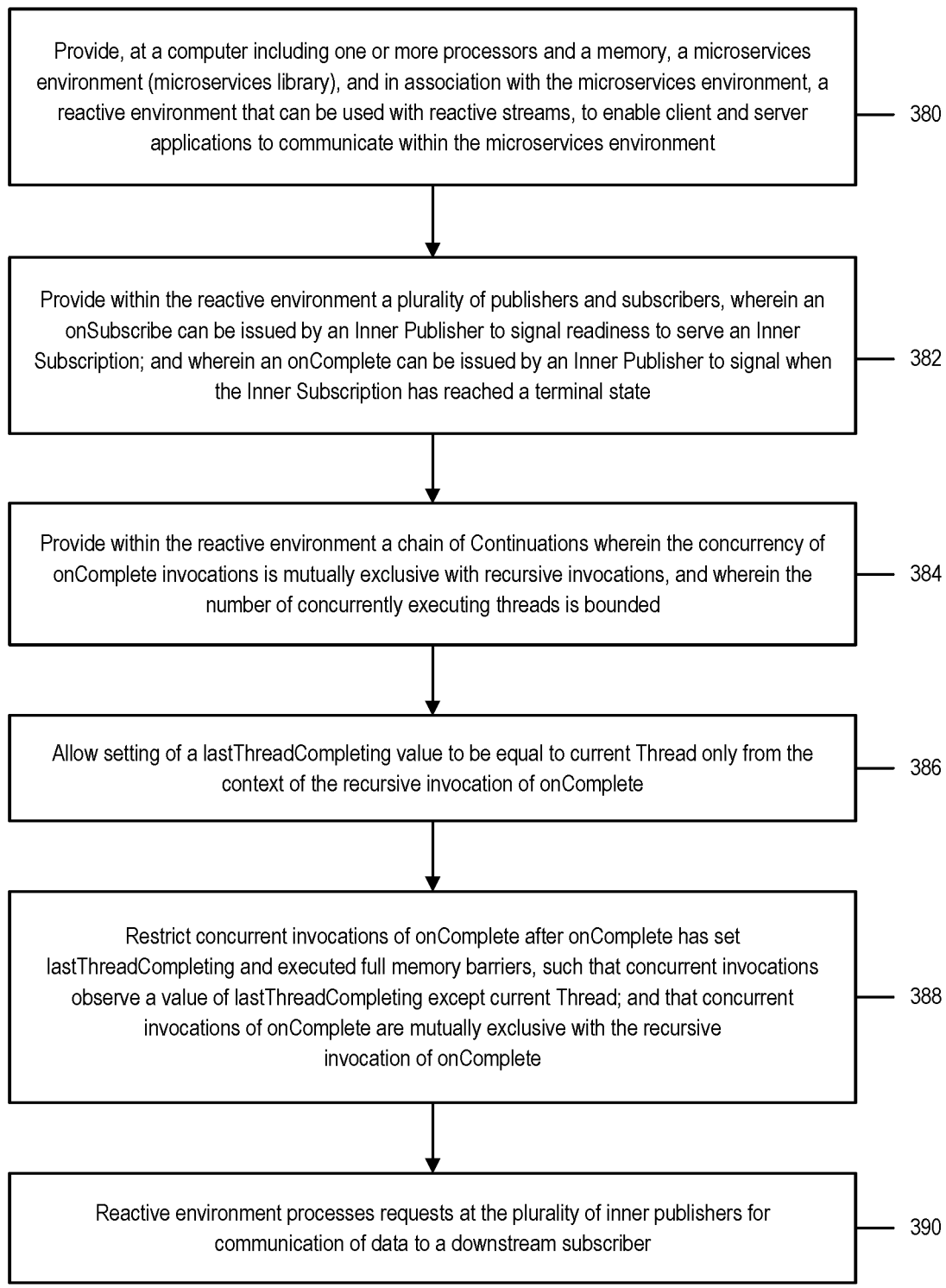
FIG. 10 illustrates a method for providing bounded recursion under bounded concurrency, in accordance with an embodiment.

FIG. 10 illustrates a method for providing bounded recursion under bounded concurrency, in accordance with an embodiment.

As illustrated in FIG. 10, in accordance with an embodiment, at step 380, a computer including one or more processors and a memory, and a microservices environment (microservices library), provides a reactive environment that can be used with reactive streams, to enable client and server applications to communicate within the microservices environment.

At step 382, provided within the reactive environment are a plurality of publishers and subscribers, wherein an onSubscribe can be issued by an inner Publisher to signal readiness to serve an inner Subscription; and wherein an onComplete can be issued by an inner Publisher to signal when the inner Subscription has reached a terminal state.

At step 384, provided within the reactive environment is a chain of Continuations wherein the concurrency of onComplete invocations is mutually exclusive with recursive invocations, and wherein the number of concurrently executing threads is bounded.

At step 386, the system operates to allow setting of a lastThreadCompleting value to be equal to current Thread only from the context of the recursive invocation of onComplete.

At step 388, the system operates to restrict concurrent invocations of onComplete after onComplete has set lastThreadCompleting and executed full memory barriers, such that concurrent invocations observe a value of lastThreadCompleting except current Thread; and that concurrent invocations of onComplete are mutually exclusive with the recursive invocation of onComplete.

At step 390, the reactive environment processes requests at the plurality of inner publishers for communication of data to a downstream subscriber.

In accordance with various embodiments, aspects of the present disclosure can include, for example:

In accordance with an embodiment, a system for providing bounded recursion under bounded concurrency with a microservices or reactive programming environment that supports the use of publishers and on-complete signals, comprising:

a computer including one or more processors, that provides access to a microservices or other computing environment, for use with software applications;

wherein the system determines during evaluation of a chain of continuations, that concurrency of on-complete invocations is mutually exclusive with recursive invocations; and wherein the system enforces a bound on recursion using one or more of a load-load fence or uncontended compare and set operation at the end of recursion.

In accordance with an embodiment, a method for providing bounded recursion under bounded concurrency with a microservices or reactive programming environment that supports the use of publishers and on-complete signals comprising:

providing, at a computer including one or more processors, a microservices or other computing environment, for use with software applications;

determining during evaluation of a chain of continuations, that concurrency of on-complete invocations is mutually exclusive with recursive invocations; and enforcing a bound on recursion using one or more of a load-load fence or uncontended compare and set operation at the end of recursion.

In accordance with an embodiment, a non-transitory computer readable storage medium, including instructions stored thereon which when read and executed by one or more computers cause the one or more computers to perform a method comprising:

providing, at a computer including one or more processors, a microservices or other computing environment, for use with software applications;

determining during evaluation of a chain of continuations, that concurrency of on-complete invocations is mutually exclusive with recursive invocations; and enforcing a bound on recursion using one or more of a load-load fence or uncontended compare and set operation at the end of recursion.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments of the systems and methods described herein illustrate usage in a Helidon microservices environment, various embodiments can be used with other types of microservice environments or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A computer-implemented method for use with a reactive computing environment, for providing bounded recursion under bounded concurrency, comprising:
providing, at a computer including one or more processors, a reactive environment that supports the use of publishers, subscribers, and on-complete signals for use with microservices and software applications, including wherein an upstream publisher publishes data items via a chain of continuations, each continuation having a plurality of inner publishers,
wherein each inner publisher is associated with an inner subscriber that provides its data via an inner subscription, wherein processing of an on-complete invocation from a first inner publisher causes start of processing on-complete invocations from a next inner publisher,
wherein the plurality of inner publishers operate to provide the data items as a stream of events for use by a downstream subscriber; and
determining during evaluation of the chain of continuations, that concurrency of the on-complete invocations is mutually exclusive with recursive invocations, including examining a value for last thread completing, from a context of a recursive invocation of on-complete, to determine whether the value for last thread completing is equal to current thread; and
in response to such determination enforcing a bound on recursion, including returning without recursion when the value for last thread completing is determined to be equal to current thread.

2. The method of claim 1, wherein the bound on recursion is enforced using one or more of a load-load fence and compare and set operation at the end of recursion.

3. The method of claim 1, wherein invocations of on-complete operate to store null if they observe no concurrent invocations.

4. The method of claim 1, wherein the reactive environment enables a client software application to communicate reactively with services, as publishers and subscribers, within a microservices environment.

5. The method of claim 1, wherein the reactive environment is provided within a cloud computing environment that provides access to one or more cloud, database, or other systems or services.

6. A system for use with a reactive computing environment, for providing bounded recursion under bounded concurrency, comprising:
a computer including one or more processors, that provides a reactive environment that supports the use of publishers, subscribers, and on-complete signals for use with microservices and software applications, wherein an upstream publisher publishes data items via a chain of continuations, each continuation having a plurality of inner publishers,
wherein each inner publisher is associated with an inner subscriber that provides its data via an inner subscription, wherein processing of an on-complete invocation from a first inner publisher causes start of processing on-complete invocations from a next inner publisher,
wherein the plurality of inner publishers operate to provide the data items as a stream of events for use by a downstream subscriber; and
wherein the system:
determines during evaluation of the chain of continuations, that concurrency of the on-complete invocations is mutually exclusive with recursive invocations, including examining a value for last thread completing, from a context of a recursive invocation of on-complete, to determine whether the value for last thread completing is equal to current thread; and
in response to such determination enforces a bound on recursion, including returning without recursion when the value for last thread completing is determined to be equal to current thread.

7. The system of claim 6, wherein the system enforces the bound on recursion using one or more of a load-load fence and compare and set operation at the end of recursion.

8. The system of claim 6, wherein invocations of on-complete operate to store null if they observe no concurrent invocations.

9. The system of claim 6, wherein the reactive environment enables a client software application to communicate reactively with services, as publishers and subscribers, within a microservices environment.

10. The system of claim 6, wherein the reactive environment is provided within a cloud computing environment that provides access to one or more cloud, database, or other systems or services.

11. A non-transitory computer readable storage medium, including instructions stored thereon which when read and executed by one or more computers cause the one or more computers to perform a method comprising:
providing, at a computer including one or more processors, a reactive environment that supports the use of publishers, subscribers, and on-complete signals for use with microservices and software applications, including wherein an upstream publisher publishes data items via a chain of continuations, each continuation having a plurality of inner publishers,
wherein each inner publisher is associated with an inner subscriber that provides its data via an inner subscription, wherein processing of an on-complete invocation from a first inner publisher causes start of processing on-complete invocations from a next inner publisher,
wherein the plurality of inner publishers operate to provide the data items as a stream of events for use by a downstream subscriber; and
determining during evaluation of the chain of continuations, that concurrency of the on-complete invocations is mutually exclusive with recursive invocations, including examining a value for last thread completing, from a context of a recursive invocation of on-complete, to determine whether the value for last thread completing is equal to current thread; and in response to such determination enforcing a bound on recursion, including returning without recursion when the value for last thread completing is determined to be equal to current thread.

12. The non-transitory computer readable storage medium of claim 11, wherein the bound on recursion is enforced using one or more of a load-load fence and compare and set operation at the end of recursion.

13. The non-transitory computer readable storage medium of claim 11, wherein invocations of on-complete operate to store null if they observe no concurrent invocations.

14. The non-transitory computer readable storage medium of claim 11, wherein the reactive environment enables a client software application to communicate reactively with services, as publishers and subscribers, within a microservices environment.

15. The non-transitory computer readable storage medium of claim 11, wherein the reactive environment is provided within a cloud computing environment that provides access to one or more cloud, database, or other systems or services.

\* \* \* \* \*